United States Patent [19]
Jurchenko et al.

[11] 3,846,613
[45] Nov. 5, 1974

[54] METHOD OF MANUFACTURING WELDING ELECTRODES

[76] Inventors: Nikolai Petrovich Jurchenko, ul. Katerinicha, 13, kv. 24, Kramatorsk; Evgeny Arkadievich Chubarov, ul. Kurortnaya, 82, Rostov; Ivan Nikolaevich Pisarenko, Budenovsky Prospekt, 96, kv. 68; Ljudmila Anatolievna Starikova, ul. Dimitrova, 103, both of Kramatorsk, all of U.S.S.R.

[22] Filed: Aug. 18, 1972

[21] Appl. No.: 281,771

[52] U.S. Cl. .................... 219/145, 117/202, 148/26
[51] Int. Cl. ............................................. B23k 35/22
[58] Field of Search ............... 219/74, 137, 146; 117/202–206; 148/24–26

[56] References Cited
UNITED STATES PATENTS
2,686,134  8/1954  Wooding ............................ 117/202
2,737,150  3/1956  Gayley .............................. 117/202

*Primary Examiner*—J. V. Truhe
*Assistant Examiner*—Clifford C. Shaw
*Attorney, Agent, or Firm*—Waters, Roditi, Schwartz & Nissen

[57] ABSTRACT

A method consists of the following operations: preparation of a coating mixture of calcium fluoride and/or rutile and/or metal oxide components, with dicalcium silicate added at the rate of 0.1 to 5 percent above 100 percent by weight of the dry mixture weight; preparation of an electrode compound by mixing the dry mixture with soluble silicate; application of the prepared electrode compound over a metal core; drying of the products and subsequently subjecting them to heat treatment.

3 Claims, No Drawings

METHOD OF MANUFACTURING WELDING ELECTRODES

The present invention relates to the field of welding and more particularly to methods of manufacturing welding electrodes.

There exist widely known methods of manufacturing welding electrodes comprising the following operations:

a. preparation of a coating mixture containing the following components taken in per cent by weight:

| | |
|---|---|
| marble | 35–60; |
| fluorspar | 15–40; |
| powdered aluminium | 1–5; |
| ferrotitanium | 10–20; |
| ferromanganese | 1–8; |
| ferrosilicon | 1–5; |
| potash | 0.5–3.0; and |
| a clod of sodium silicate (ground) | 1–5.0. | b. preparation of an electrode compound by thoroughly mixing the above-listed components with soluble sodium silicate having a density of 1.46–1.5 g/cm$^3$ and amounting to 15–25 percent of the total weight of the other components;

c. pressure-coating of a metal core with the electrode compound thus prepared such that the thickness of the coating is from 6 to 7 mm, the metal core having a diameter of 4 mm;

d. drying of the molding or coated core at a temperature of 18°–25°C for 3 to 5 days; and e. heat treatment of the molding in a two-step process: first for 1–1.5 hr at 100°–150°C and then for 1.5–2 hr at 400°–450°C.

Also known are methods of manufacturing welding electrodes comprising the following operations:

a. preparation of a mixture containing the following components taken in per cent by weight:

| | |
|---|---|
| marble | 10–25; |
| fluorspar | 15–45; |
| powdered cast iron | 5–15; |
| powdered aluminium | 5–10; |
| silicon carbide | 15–25; |
| graphite | 5–10; |
| cellulose | 1–5; and |
| soda ash | 0.5–3.0; | b. preparation of an electrode compound by mixing the dry components with soluble sodium silicate having a density of 1.46–1.5 g/cm$^3$ and amounting to 20–35 percent of the dry mixture by weight;

c. pressure-coating of a metal core 4 mm in diameter with the electrode compound thus prepared such that the thickness of the coating in from 6 to 7 mm;

d. drying of the molding or coated core at a temperature of 18°–25°C for 3 to 5 days; and e. heat treatment of the molding or coated core in a two-step process: first for 1.0–1.5 hr at 100°–150°C and then for 2.0–2.5 hr at 400°–450°C.

Also known in the art are other methods of manufacturing welding electrodes which comprise procedures analogous to the above-described methods.

In one such method, a mixture is prepared on the basis of the following components taken in per cent by weight:

| | |
|---|---|
| rutile concentrate | 15–25; |
| hematite | 15–40; |
| feldspar | 5–15; |
| marble | 5–15; |
| ferrosilicon | 5–10; |
| ferromanganese | 15–25; and |
| cellulose | 1–5. |

The electrode compound is obtained by mixing the dry components with soluble silicate — a mixture of sodium and potassium silicates in the ratio of 7 sodium silicate to 3 potassium silicate. The density of the soluble silicate is from 1.46 to 1.5 g/cm$^3$ and amounts to 20–30 percent of the dry components by weight.

A metal core is covered with the compound thus obtained in a manner similar to that of the abovedescribed methods, whereupon the moldings were dried for 3 to 5 days at a temperature of 18°–25°C.

Drying is likewise followed by a two-step heat treatment for 1.0–1.5 hr at 80°–100°C and then for 1.5–2.0 hr at 200°–250°C.

A serious disadvantage common to all of the above-described methods of manufacturing welding electrodes is that they require considerable drying time for the moldings or coated cores for the reason that a substantial quantity of moisture is needed in the preparation and application of the coating of the electrode compound. Consequently a lot of time is required to remove that moisture from the moldings or coated cores.

Another, no less serious, disadvantage of the known methods resides in the fact that during the process of drying of the moldings or coated cores, a film is formed on the surfaces, trapping the remaining moisture within them.

This produces an adverse effect on the subsequent heat treatment of the moldings insofar as it causes circular and longitudinal cracking of the electrode surface as well as deformation of the electrodes.

It is an object of the present invention to reduce the drying time required for the moldings.

Another object of the present invention is to obtain welding electrodes having a smooth surface throughout the entire volume in order to obviate any distorsion of the moldings and prevent cracking of their surfaces.

It is still a further object of this invention to provide an optimum composition of an electrode compound mixture that will require a shorter period of drying of the moldings or coated cores.

Accordingly, there is provided a method for manufacturing welding electrodes by covering a metal core with an electrode compound of calcium fluoride and/or rutile and/or metal oxide components mixed with soluble silicate; drying the moldings thus obtained with subsequent heat treatment thereof, whereby, according to the present invention, the coating mixture includes dicalcium silicate to the extent of 0.1–5 percent above 100 percent of the dry mixture weight, that is, based on the weight of the dry coating mixture.

The advantage of the proposed method is a considerable reduction in the drying time required for the moldings or coated cores with consequent improvement in the overall operating efficiency.

This effect is achieved through adding dicalcium silicate to the mixture, with the dry components subsequently mixed with soluble silicate, which not only results in a reduction of the drying time, but also results in higher quality welding electrodes insofar as the present method prevents shape distorsion, cracking and other defects on the of the electrodes.

The principle of the proposed method will be better understood from the following detailed description taken in conjunction with examples.

The subject method of manufacturing welding electrodes includes the following operations:

a. preparation of a coating mixture on the basis of calcium fluoride and/or rutile and/or metal oxide components;

b. addition to the mixture of dicalcium silicate to the extent of 0.1–5.0 percent of the weight of the other components;

c. preparation of an electrode compound by mixing in a mixer the dry components with soluble silicate added at the rate of 15–45 per cent of the dry components by weight, the mixture being constantly agitated and a small quantity of water added for 5 to 10 minutes to improve the plasticity of the paste;

d. pressure-coating of a metal core with the electrode compound, the coat thickness being from 6 to 7 mm;

e. drying of the products for 15–20 hr at a temperature of 18°–25°C; and f. two-step heat treatment of the products: first for one hour at 80°–150°C and then for two hours at 200°–450°C.

The present method utilizing the principle of this invention uses the slag of ferrochrome production as the dicalcium silicate.

Given below are some examples illustrating the essence of the present invention.

EXAMPLE 1

The mixture was prepared from dry components taken in percent by weight as follows:

| | |
|---|---|
| marble | 51.0; |
| fluorspar | 28.0; |
| powdered aluminium | 1.0; |
| ferromanganese | 4.0; |
| ferrosilicon | 3.0; and |
| ferrotitanium | 13.0 |

In addition, the following components are added by weight, in amounts based on 100 percent of the weight of the foregoing mixture, to the mixture.

| | |
|---|---|
| potash | 0.8; |
| a clod of sodium silicate (ground) | 2.0; and |
| slag of ferrochrome production | 1.7. |

Soluble sodium silicate of density 1.49 g/cm$^3$ and modulus 2.8 was added to the above-described mixture at the rate of 23 percent by weight based on the weight of the dry components and the electrode compound thus obtained applied over a metal core.

The products were dried for 20 hr at a temperature of 18°–25°C whereupon they were heat treated in two steps: first for 1.0 hr at 80°–100°C and then for up to 2.0 hr at 400°C.

The electrodes manufactured according to said method were characterized by the following features:

1. Electrode diameter variation (due to ellipticity or sag) was not more than 6 percent.

2. Displacement of the longitudinal groove relative to the generatrix (twist) was not more than 15°.

EXAMPLE 2

The mixture was prepared from dry components taken in per cent by weight as follows:

| | |
|---|---|
| marble | 19.0; |
| fluorspar | 30.0; |
| powdered cast iron | 10.0; |
| powdered aluminium | 6.0; |
| silicon carbide | 23.0; |
| crystalline graphite | 9.0; and |
| cellulose | 3.0. |

In addition, the following components are added by weight, in amounts based on 100 percent of the weight of the foregoing mixture, to the mixture.

| | |
|---|---|
| calcinated soda | 1.0; and |
| slag of ferrochrome production | 2.0. |

Soluble sodium silicate of density 1.48 g/cm$^3$ and modulus 2.8 was added to the mixture at the rate of 30 percent by weight of the dry components, whereupon the electrode compound thus obtained was applied over a metal core.

The products were dried for 16 hr at a temperature of 18°–25°C and then heat treated in two steps: first for up to one hour at 80°–100°C and then for 2 hr at 400°–450°C.

The electrodes manufactured according to said method were characterized by the following features:

1. Electrode diameter variation (due to ellipticity or sag) was not more than 5 percent.

2. Displacement of the longitudinal groove relative to the generatrix (twist) was not more than 10°.

EXAMPLE 3

The mixture was prepared from dry components taken in per cent by weight as follows:

| | |
|---|---|
| rutule concentrate | 20.0; |
| hematite | 30.0; |
| feldspar | 13.0; |
| marble | 8.0; |
| ferrosilicon | 8.0; |
| ferromanganese | 18.0; and |
| cellulose | 3.0. |

In addition, the mixture contained above 100% the following components in per cent by weight based on the weight of the dry mixture:

| | |
|---|---|
| slag of ferrochrome production | 2.2. |

A mixture of sodium and potassium silicates in the ratio of 7 sodium silicate to 3 potassium silicate, having a density of 1.48 g/cm$^3$ and a modulus of 3.0, was added to the dry components at the rate of 25 percent by weight, with the electrode compound thus obtained applied over a metal core.

The products were dried for 18 hr at a temperature of 18°–25°C and then heat treated in two steps: first for 1 hr at 80°–100°C and then for 1.5 hr at 900°C.

The electrodes manufactured according to said method were characterized by the following features:

1. Electrode diameter variation (due to ellipticity or sag) was not more than 6 percent.

2. Displacement of the longitudinal groove relative to the generatrix (twist) was not more than 15°.

What we claim is:

1. A method for manufacturing welding electrodes comprising the steps of preparing a coating mixture comprising calcium fluoride, rutile and metal oxide components, adding to said mixture dicalcium silicate in an amount from 0.1–5 percent by weight based on the weight of said mixture, mixing said coating with soluble silicate, coating the resulting mixture on a metal core and subsequently applying heat to the coated core.

2. A method for manufacturing welding electrodes comprising the steps of forming a coating mixture, adding to said mixture dicalcium silicate in an amount from 0.1 to 5 percent by weight of the mixture, mixing the resulting mixture containing said dicalcium silicate with soluble silicate, applying the final resulting mixture to a metal core and forming a coating thereof on said core, drying the coated core and subsequently applying heat to said coated core.

3. A method as defined in claim 2 wherein the dicalcium silicate consists of ferrochrome slag.

* * * * *